United States Patent
Ichikawa et al.

(10) Patent No.: US 8,363,254 B2
(45) Date of Patent: Jan. 29, 2013

(54) DOCUMENT MANAGEMENT SYSTEM

(75) Inventors: Yasuhisa Ichikawa, Nagoya (JP); Takuya Nagai, Nagoya (JP); Hiroaki Fujino, Nagoya (JP); Kazutaka Yamamoto, Nagoya (JP); Katsuru Kobayashi, Woluwe Saint Pierre (BE); Kunihiro Yasui, Nagoya (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 588 days.

(21) Appl. No.: 12/584,322

(22) Filed: Sep. 3, 2009

(65) Prior Publication Data

US 2010/0060931 A1    Mar. 11, 2010

(30) Foreign Application Priority Data

Sep. 8, 2008  (JP) .................. 2008-230325

(51) Int. Cl.
*G06F 15/00* (2006.01)
*H04Q 5/22* (2006.01)
(52) U.S. Cl. ..................... 358/1.15; 340/10.1
(58) Field of Classification Search .................. 358/1.15
See application file for complete search history.

(56) References Cited

U.S. PATENT DOCUMENTS

| 6,008,727 | A | 12/1999 | Want et al. |
| 2004/0100363 | A1 | 5/2004 | Lane et al. |
| 2004/0194133 | A1 | 9/2004 | Ikeda et al. |
| 2009/0174531 | A1 | 7/2009 | Ohashi et al. |
| 2011/0140857 | A1* | 6/2011 | Hull et al. .................. 340/10.1 |

FOREIGN PATENT DOCUMENTS

| EP | 1 577 812 | 9/2005 |
| EP | 1 710 728 | 10/2006 |
| JP | 05-151278 A | 6/1993 |
| JP | 2000-225745 A | 8/2000 |
| JP | 2003-242158 A | 8/2003 |
| JP | 2004318834 | 11/2004 |
| JP | 2005-165997 A | 6/2005 |

(Continued)

OTHER PUBLICATIONS

"The Cutting Edge of RFID Technology and Applications for Manufacturing and Distribution" D'Hont S., Internet Citation, XP002408100; URL: http://www.ti.com/rfid/docs/manuals/whtPapers/manuf_dis.pdf Date : Nov. 20, 2006.

(Continued)

*Primary Examiner* — Saeid Ebrahimi Dehkordy
(74) *Attorney, Agent, or Firm* — McCarter & English, LLP

(57) ABSTRACT

This disclosure discloses a document management system comprising: a scan apparatus provided with an optical reading device configured to optically read a paper medium to be processed and to create image data corresponding to said paper medium; a radio frequency identification (RFID) label producing apparatus configured to produce an RFID label to be affixed onto said paper medium, having a tag communication device that carries out radio communication to an RFID tag circuit element provided with an IC circuit part storing information and a tag antenna that transmits and receives information in reading by said optical reading device; and a database configured to store said image data corresponding to said paper medium and tag identification information of said RFID tag circuit element provided at said RFID label corresponding to said paper medium in association with each other, provided inside said scan apparatus or separately from said scan apparatus.

6 Claims, 15 Drawing Sheets

FOREIGN PATENT DOCUMENTS

| | | |
|---|---|---|
| JP | 2006-005442 A | 1/2006 |
| JP | 2007-034446 A | 2/2007 |
| JP | 2007-084318 A | 4/2007 |
| JP | 2008-049683 A | 3/2008 |
| WO | WO 02/099730 | 12/2002 |

OTHER PUBLICATIONS

Japanese Office Action of JP 2008-230325 dated Dec. 14, 2012.

* cited by examiner

FIG. 10

CONTRACT FILING SHEET

| | SIGNED BY MANAGER | SIGNED BY STAFF |
|---|---|---|
| | | |

1. FILING DIVISION

| DIVISION NAME | DEVELOPMENT DIVISION | | | | DATE OF FILING | JUNE 26, 2008 |
|---|---|---|---|---|---|---|
| DIVISION CODE (UPPER 4 DIGITS) | E | 1 | 3 | 5 | PERSON IN CHARGE OF CONTRACT | YASUSHI SATO (EXT.) 1386 |

2. FILED CONTRACT

| NAME OF CONTRACT | MEMORANDUM | | |
|---|---|---|---|
| NAME OF COUNTER PARTY | ASTRO LABORATORY INC. | DATE OF EFFECT (IN CASE OF COMING INTO EFFECT ON THE DATE EXCEPT DATE OF CONCLUSION) | (MONTH) (DATE), (YEAR) |
| DATE OF CONCLUSION | JUNE 25, 2008 | EXPIRY DATE | TILL JUNE 24, 2009 |
| SIGNED BY (CHECK MAY BE PLURAL) | ☐ CHIEF EXECUTIVE ☐ VICE-EXECUTIVE<br>☐ SENIOR MANAGING DIRECTOR<br>☐ MANAGING DIRECTOR<br>☐ PRESIDENT ☑ OTHERS | UPDATE PROVISIONS | ☐ YES<br>→EXPIRY DATE TO BE APPLIED PRIOR TO ___ MONTHS (DAYS)<br>→AUTOMATIC UPDATE PROVISIONS (YES / NO)<br>☑ NO |
| ORIGINAL STORED BY (FILL IN ONLY IF DIFFERENT FROM FILING DIVISION) | | | |
| REVENUE STAMP AFFIXED | ☐ YES<br>→ YEN STANDARD/NON-STANDARD<br>☑ NO | SURVIVING PROVISIONS (PROVISIONS SURVIVING TERMINATION OF CONTRACT) | ☐ YES → TILL JUNE 24, 2012<br>☐ NO |
| OTHER FILINGS | ☑ IN-HOUSE APPROVAL OBTAINED ☑ LEGAL EXAMINATION NO. (NO. 20641)<br>☐ APPROVED BY BOARD OF DIRECTORS ( DATE ) ☐ EXTERNAL ORGAN ( ) FILED | | |

| DOCUMENT NUMBER | DOCUMENT TYPE | DOCUMENT NAME | PRODUCED BY | SIZE/PAGE NUMBER |
|---|---|---|---|---|
| A0035 | CONTRACT | CONTRACT FILING SHEET | YASUSHI SATO | A4, 1 |
| ... | ... | ... | ... | ... |
| ... | ... | ... | ... | ... |

FIG. 14

CONTRACT FILING SHEET

T

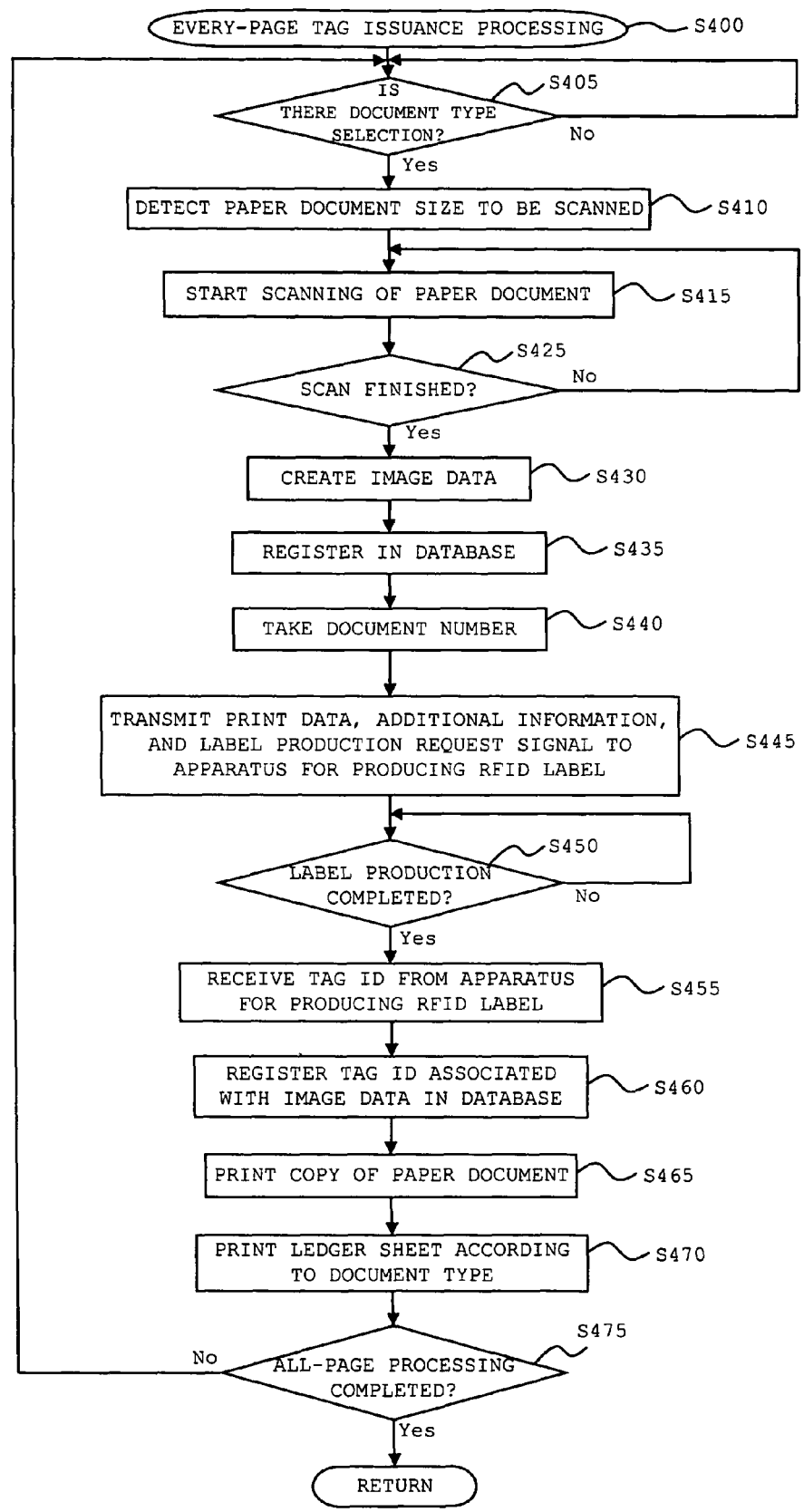

DOCUMENT MANAGEMENT SYSTEM

CROSS-REFERENCE TO RELATED APPLICATION

The present application claims priority from Japanese Patent Application No. 2008-230325, which was filed on Sep. 8, 2008, the disclosure of which is incorporated herein by reference in its entirety.

BACKGROUND OF THE INVENTION

1. Field of the Invention

The present invention relates to a document management system configured to manage a paper medium and electronic data thereof.

2. Description of the Related Art

Recently, a Radio Frequency Identification (RFID) system in which information reading and writing is carried out contactlessly between an RFID tag and a reader/writer as reading device or writing device has been put into practical use in various fields. There is a prior art reference that applies this RFID system to a document management system.

The document management system as contents management system of this prior art reference obtains image data as contents information made into electronic data by optically reading a paper medium as display medium with optical reading device as image reading portion, reads out tag identification information as identification information via radio communication from an RFID tag circuit element as RFID tag provided in advance in the paper medium, and manages the paper medium by associating the image data with the tag identification information.

In the document management system of the above prior art reference, if document contents are to be viewed, the contents of the document can be viewed at any time by obtaining image data of the target document. On the other hand, in a case of tax audit, for example, not the electronic data but a paper medium itself might be needed. In such a case, since the image data made into electronic data and the tag identification information are managed in association with each other in the above system, a location of the paper medium can be searched by specifying an RFID tag circuit element to be searched with the tag identification information and carrying out information reading of the RFID tag circuit element by a reader via radio communication.

At this time in the document management system of the above prior art reference, only the tag identification information is stored in the RFID tag circuit element provided in advance in the paper medium, and it was not possible to store additional information of the document type, paper size, page number, for example of the paper medium in the RFID tag circuit element so that the additional information is used when the above search is made, which leaves room for improvement of convenience in a search work. Further, since the RFID tag circuit element is provided in the paper medium in advance, it is not possible to make display such as printing of information relating to the paper medium on the surface of the RFID tag circuit element or tag medium including the RFID tag circuit element, which also leaves room for improvement of convenience in the above search. Moreover, since the RFID tag circuit element is provided in the paper medium in advance, an attachment location such as front face or back face, upper end or lower end of the RFID tag circuit element in the paper medium can not be selected freely, which might lower communicability of radio communication in the above search depending on a storage mode of the paper medium.

As described above, in the document management system of the prior art reference, there is still room for improvement in terms of convenience and efficiency of the search for the paper medium itself, and efficient document management can not necessarily be made.

SUMMARY OF THE INVENTION

The present invention has an object to provide a document management system that can realize efficient document management by carrying out both making paper medium into electronic data and attaching an RFID label to a paper medium in a lump.

BRIEF DESCRIPTION OF THE DRAWING

FIG. 10 is a view illustrating an example of a paper document on which the RFID label produced by the apparatus for producing RFID labels is affixed.

FIG. 13 illustrates a search result list printed in a format capable of listing the search results by the multi-function device.

FIG. 14 is an appearance view of the RFID label produced by the apparatus for producing RFID labels in a variation in which print data is created on the basis of image data.

FIG. 16 is a flowchart illustrating a detailed procedure of every-page tag issuance processing at Step S400.

DETAILED DESCRIPTION OF THE PREFERRED EMBODIMENTS

An embodiment of the present invention will be described below referring to attached drawings.

Figure 1:
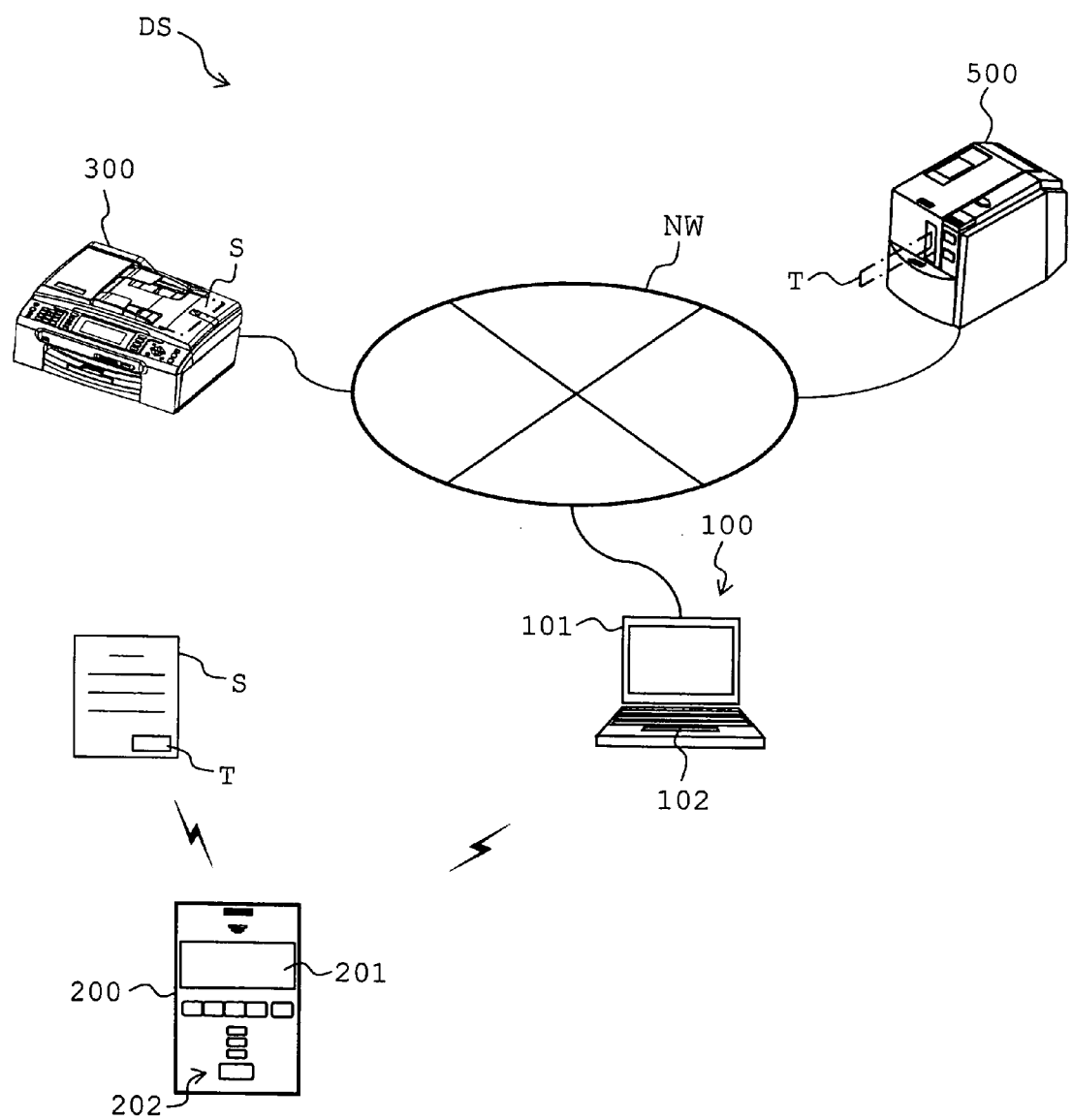
FIG. 1 is a system configuration diagram illustrating an entire configuration of a document management system of this embodiment.

As shown in FIG. 1, a document management system DS of this embodiment carries out document management by making a paper document S as paper medium to be processed into electronic data, producing an RFID label T to be affixed to the paper document S in a lump, and storing the created image data and a tag ID of the corresponding RFID label T in association with each other in a database. This document management system DS comprises a multi-function device 300, an apparatus 500 for producing RFID labels, and a database 92. The multi-function device 300 has an image scanner function that optically reads the paper document S to be processed and creates corresponding image data. The apparatus 500 for producing RFID labels has an apparatus antenna 501 that carries out radio communication to an RFID tag circuit element To in reading by the multi-function device 300. The RFID circuit element To has an IC circuit part 150 storing information and a tag antenna 151 for information transmission and reception (See FIG. 2 for example, which will be described later). The apparatus 500 for producing RFID labels produces the RFID label T to be affixed onto the paper document S. The database 92 is provided inside the multi-function device 300. The database 92 stores a document number, which is identification information of the paper document S, corresponding image data, and the tag ID of the RFID tag circuit element To provided at the corresponding RFID label T, in association with each other.

Further, the document management system DS has an operation terminal 100 such as PC, and a reader 200. The operation terminal 100 has a display portion 101 and an operation portion 102. The operation terminal 100 is used for registration of detailed information such as document name, producer name of the paper document S by an operator through the operation portion 102, or used for input of a search target when the paper document S itself is searched in case of using a reader 200, which will be described later. The reader 200 is connected to the operation terminal 100 via inter-terminal radio communication such as Bluetooth (registered trademark) capable of information input and output. The reader 200 can read information from the RFID label T produced by the apparatus 500 for producing RFID labels. The operation terminal 100, the multi-function device 300, and the apparatus 500 for producing RFID labels are connected capable of information input/output via wired or wireless network NW such as LAN, wireless LAN.

Figure 2:
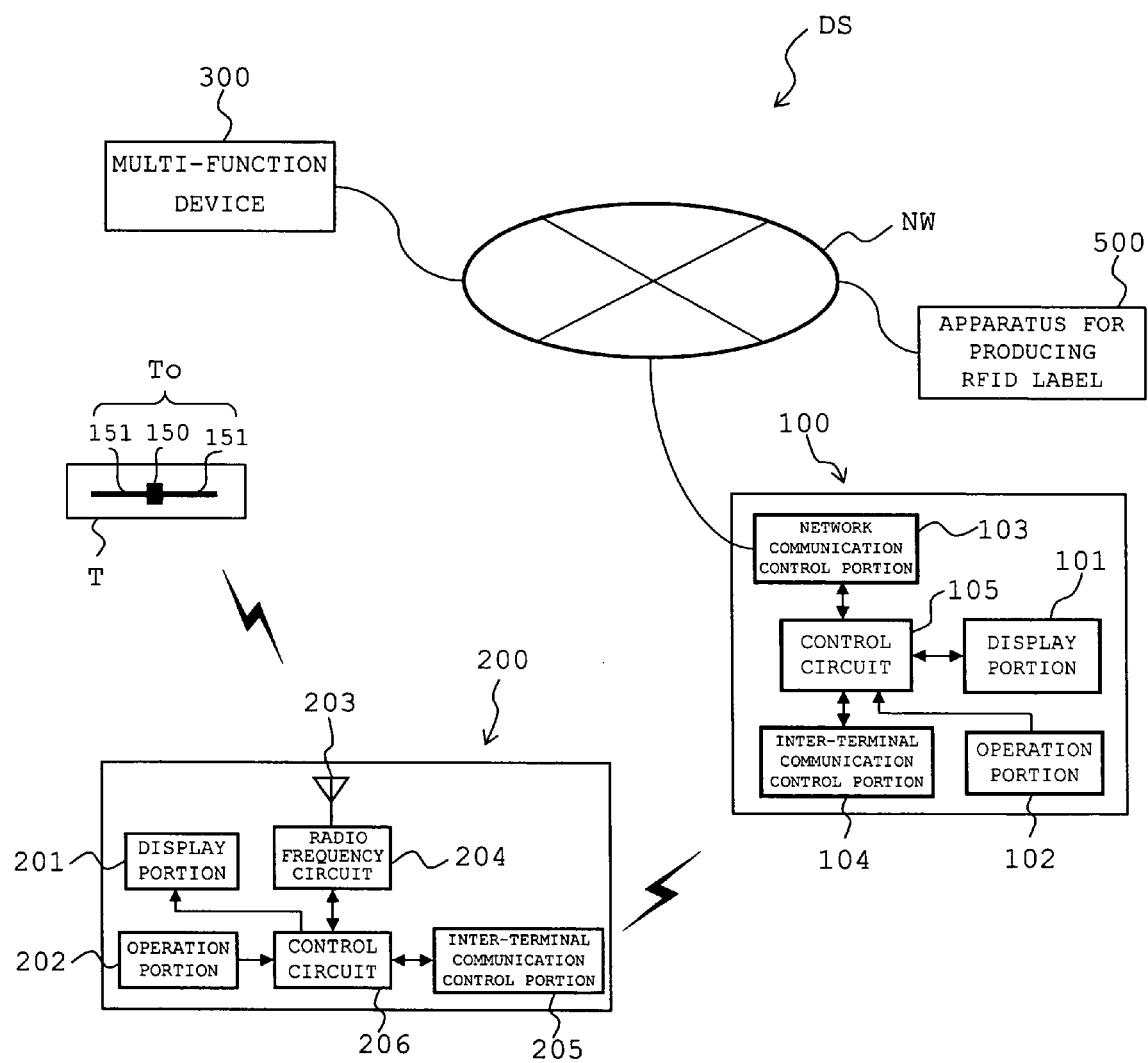
FIG. 2 is a functional block diagram conceptually illustrating a functional configuration of the entire system of the document management system.

As shown in FIG. 2, the operation terminal 100 has the display portion 101, the operation portion 102, a network communication control part 103, an inter-terminal communication control part 104, and a control circuit 105. The display portion 101 displays various operation screens, such as input screen. The operation portion 102 includes an appropriate buttons such as keys, a mouse, for an operator to make an operation input. The network communication control part 103 controls network communication performed with the multi-function device 300 and the apparatus 500 for producing RFID labels via the network NW. The inter-terminal communication control part 104 controls inter-terminal radio communication performed with the reader 200. The control circuit 105 controls an operation of the entire operation terminal 100 including the display portion 101, the network communication control part 103, and the inter-terminal communication control part 104.

The reader 200 as reader apparatus has a display portion 201, an operation portion 202, a reader antenna 203, a radio frequency circuit 204, an inter-terminal communication control part 205, and a control circuit 206. The display portion makes various displays such as discovery display of the search target, for example. The operation portion 202 is for various operation inputs. The reader antenna 203 transmits and receives a signal with the RFID tag circuit element To of the RFID label T via radio communication. The radio frequency circuit 204 makes an access to the IC circuit part 150 of the RFID tag circuit element To through the reader antenna 203 and processes a signal read from the RFID tag circuit element To. The inter-terminal communication control part 205 controls inter-terminal radio communication performed with the operation terminal 100. The control circuit 206 controls the entire reader 200 including the display portion 201, the radio frequency circuit 204, and the inter-terminal communication control part 205.

Using the reader 200 with the above configuration, an operator can specify the RFID tag circuit element To of the RFID label T produced by the apparatus 500 for producing RFID labels and affixed to the paper document S using the tag ID obtained from the database 92, read information from the specified RFID tag circuit element To via radio communication, and search the paper document S itself, that is, original (the details will be described later).

Figure 3:
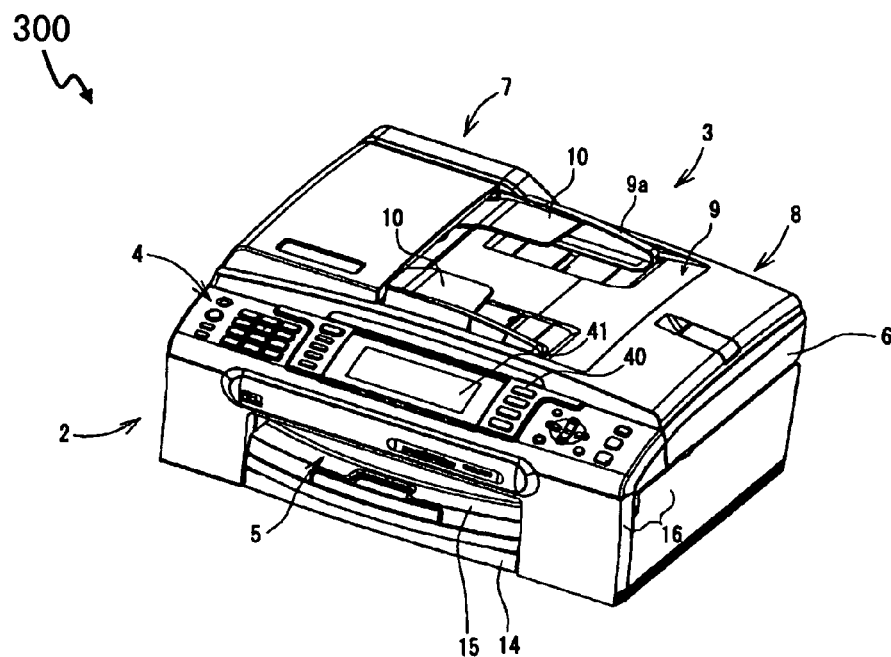
FIG. 3 is a perspective view illustrating an appearance structure of a multi-function device.
Figure 4:
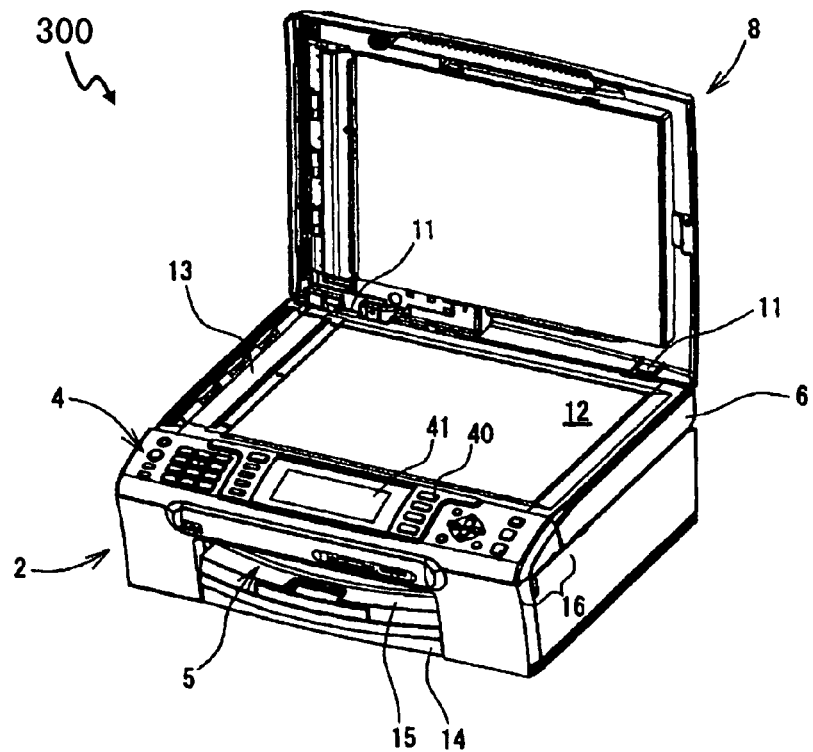
FIG. 4 is a perspective view illustrating the appearance structure of the multi-function device in a state in which a manuscript cover is opened.

As shown in FIGS. 3 and 4, the multi-function device 300 as scan apparatus is a Multi Function Center (MFC) integrally having a printer portion 2 provided at a lower part, an image scanner portion 3 provided at an upper part, and an operation panel 4 provided on a front side of the scanner portion 3 and has a plurality of functions of scanner function, copying function, printer function, for example.

The scanner portion 3 as an optical reading device has a manuscript platen 6 and a manuscript cover 8. The manuscript cover 8 has an automatic manuscript feeding mechanism 7. The manuscript cover 8 is attached capable of being opened or closed through a hinge 11 (See FIG. 4) on a back face side of the manuscript platen 6. On an upper face of the manuscript platen 6, a platen glass 12 is disposed, and inside the manuscript platen 6, an image reading unit, not shown, is built in. The automatic manuscript feeding mechanism 7 feeds a manuscript from a manuscript tray 9 to a manuscript discharge tray 10 through a manuscript feeding path.

The manuscript tray 9 is provided with a movable wall portion 9a which is movable in a width direction, that is, a depth direction of the multi-function device 300, of the manuscript. Thus, a paper size of the manuscript to be scanned, placed on the manuscript tray 9, is detected by a position of the movable wall portion 9a. The manuscript is paper document S in this embodiment. The same applies to the following.

If the manuscript is to be scanned by the scanner portion 3 of the multi-function device 300, the manuscript cover 8 is opened and the manuscript is placed on the platen glass 12 as shown in FIG. 4, and then, the manuscript cover 8 is closed, and the manuscript is secured. Then, if a reading start command is input through an operation key 40, the image reading unit is made to scan along a back face of the platen glass 12, and the manuscript is scanned. In the case of scanning by automatic manuscript feeding, in a state where the manuscript cover 8 is closed on the manuscript platen 6 as shown in FIG. 3, the manuscript placed on the manuscript tray 9 is fed by the automatic manuscript feeding mechanism 7, and during passage on a reading face 13 on the manuscript platen 6 in a feeding course to the manuscript discharge tray 10, scanning is executed by the image reading unit standing by below the reading face 13.

The printer portion 2 as a second printing device is an image printing device configured to print a text or image, for example on a print sheet on the basis of image data optically read by the scanner portion 3 and created and data received from an external device such as the operation terminal 100. As an image printing method of the printer portion 2, various image printing methods such as inkjet method, electrophotographic method or thermal transfer method can be employed. The printer portion 2 prints and generates a copy of the paper document S according to the scanning by the scanner portion 3 and moreover, prints and generates a ledger sheet according to an operation input of the operation key 40 in printing of the copy (the details will be described later).

In an opening 5 formed on a front side of the printer portion 2, a sheet supply tray 14 and a sheet discharge tray 15 are provided. Print sheets contained in the sheet supply tray 14 is fed out to a sheet feeding path, not shown, on which a text or an image, for example is printed at an image printing position during the sheet feeding path, and then, discharged to the sheet discharge tray 15.

The operation panel 4 is used to operate the printer portion 2 and the scanner portion 3 and is provided on an upper part of a projecting portion 16. This operation panel 4 has the operation key 40 as an operating device and a liquid crystal display 41, and the operator can make a desired operation input such as selection of a document type (The details will be described later) using the operation key 40 while referring to the liquid crystal display 41. Further, the operator can make an operation input on a document type of the paper document S in the scanning of the paper document S using the operation key 40 (The details will be described later). The operation signal input by the operation key 40 is input to a control circuit 80 (which will be described later).

Figure 5:
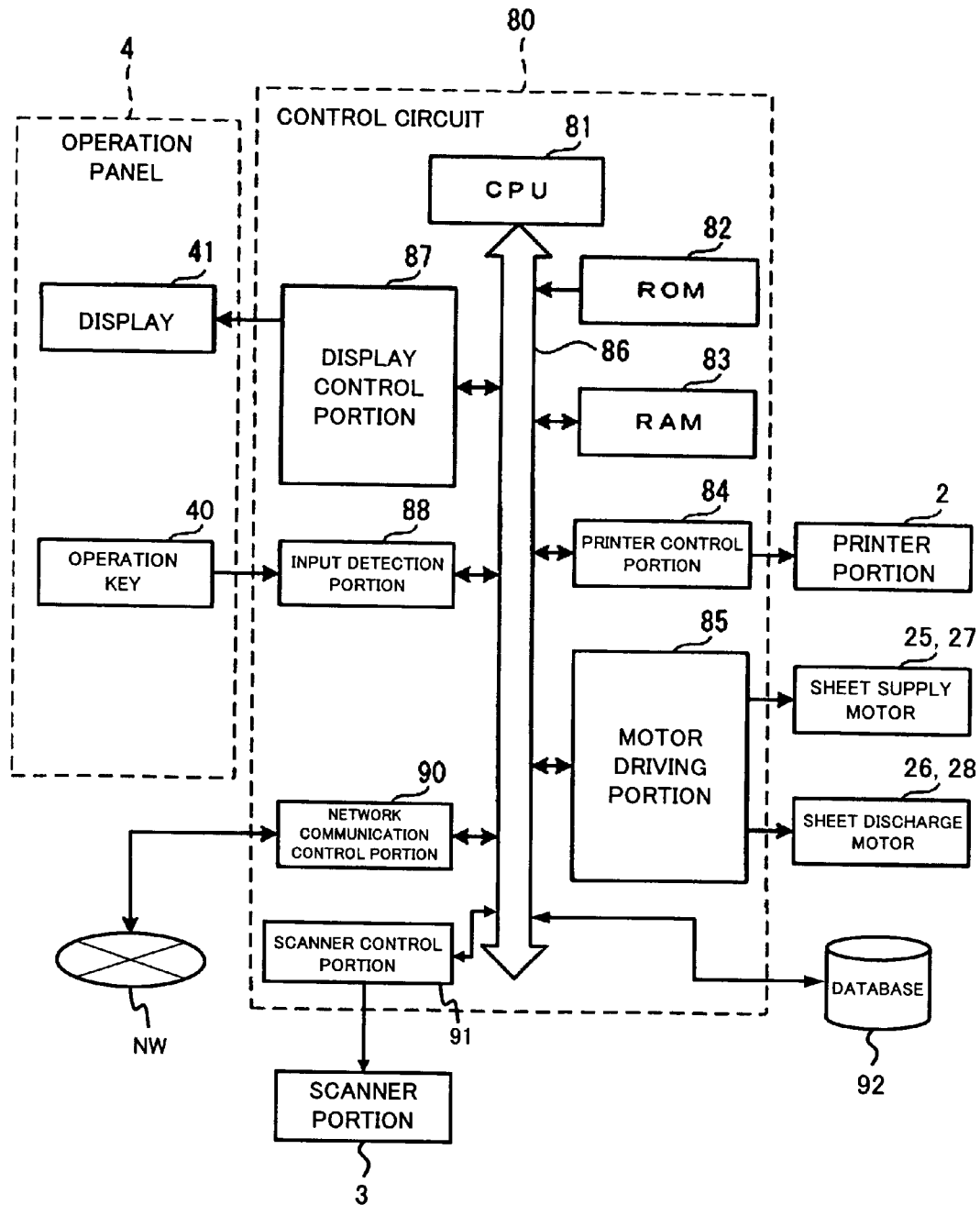
FIG. 5 is a functional block diagram illustrating an electric configuration of the multi-function device.

As shown in FIG. 5, the multi-function device 300 is provided with the operation panel 4, the control circuit 80 and the above-described database 92 as the configuration relating to its electric control.

The control circuit 80 has a CPU 81, a ROM 82, a RAM 83, a printer control part 84, a sheet supply motor 25, a sheet discharge motor 26, a motor driving portion 85, an image scanner control part 91, a display control part 87, an input detection portion 88, and a network communication control part 90. The CPU 81 controls the entire multi-function device 300. The ROM 82 stores various control programs, for example executed by the CPU 81. The RAM 83 temporarily stores data. The printer control part 84 controls printing by the printer portion 2. The sheet supply motor 25 feeds out a printing sheet contained in the sheet supply tray 14 to the sheet feeding path. The sheet discharge motor 26 discharges the printing sheet on which printing is finished to the sheet discharge tray 15 in the printer portion 2. The motor driving portion 85 drives a sheet supply motor 27 that feeds out a manuscript placed on the manuscript tray 9 to the reading face 13 and a sheet discharge motor 28 that discharges the manuscript for which image reading is finished to the manuscript discharge tray 10 in the scanner portion 3. The scanner control part 91 controls scanning by the scanner portion 3. The display control part 87 controls display of the liquid crystal display 41 provided on the operation panel 4. The input detection portion 88 receives an input of various operation keys 40 provided on the operation panel 4. The network communication control part 90 controls network communication performed with the operation terminal 100 and the apparatus 500 for producing RFID labels through the network NW. The CPU 81, the ROM 82, the RAM 83, the printer control part 84, the sheet supply motor 25, the sheet discharge motor 26, the motor driving portion 85, the scanner control part 91, the display control part 87, the input detection portion 88, and the network communication control part 90 are connected through a bus 86 with one another.

Figure 6:
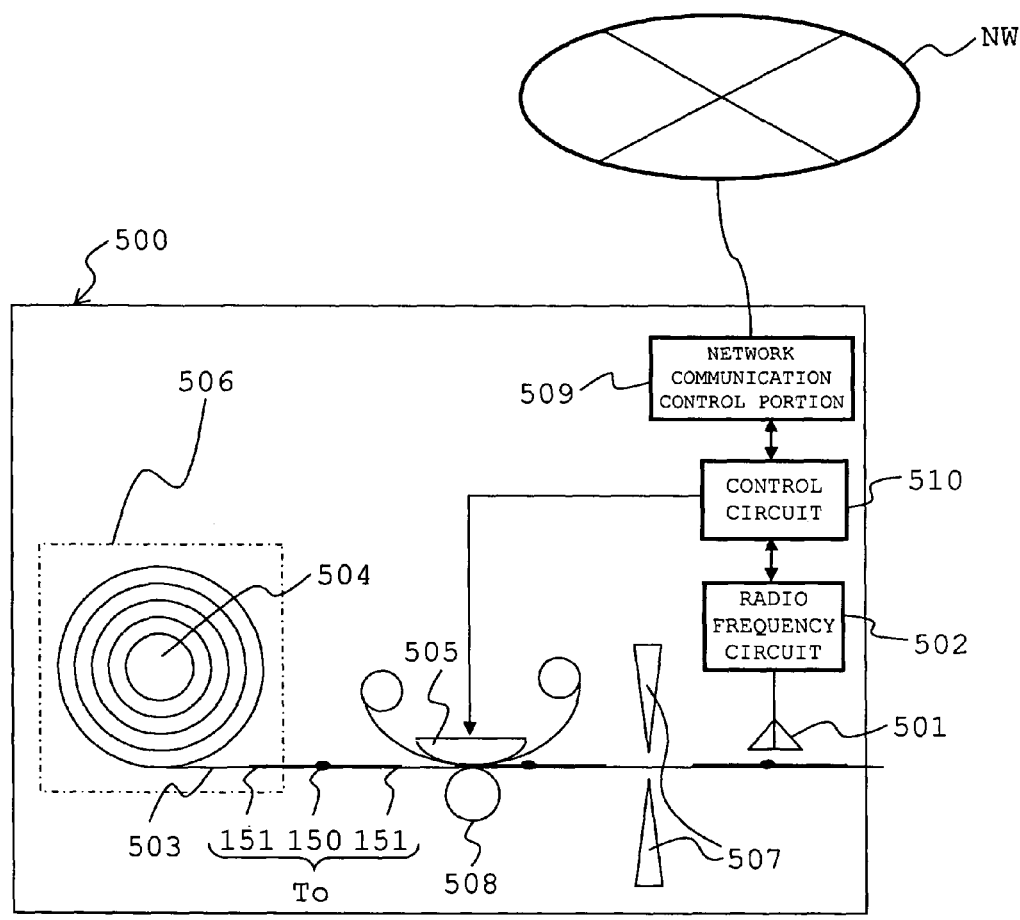
FIG. 6 is a functional block diagram illustrating a functional configuration of an apparatus for producing RFID labels.

As shown in FIG. 6, the apparatus 500 for producing RFID labels is provided with a function to produce the RFID tag T provided with the RFID tag circuit element To as described above. The apparatus 500 for producing RFID labels has a cartridge holder 506, a print head 505 as a first printing device, a feeding roller 508, an apparatus antenna 501 as a tag communication device, a radio frequency circuit 502, a cutter 507, a network communication control part 509, and a control circuit 510. A cartridge (not shown) or a roll 504 of a tape can be detachably attached to the cartridge holder 506. The tag tape 503 is wound around the roll 504, and the tag tape 503 is provided with RFID tag circuit elements To at a predetermined interval. Note that the tag tape 503 is wound in a spiral state but simplified and shown with a concentric circle. The print head 505 performs desired printing on an area corresponding to each RFID tag circuit element To in the tag tape 503 as print-receiving medium fed out of the roll 504 of a tape with RFID tags. The feeding roller 508 feeds the tag tape 503. The apparatus antenna 501 and the radio frequency circuit 502 carries out information transmission and reception via radio communication with the RFID tag circuit element To provided at the tag tape 503 so as to write RFID tag information. The cutter 507 cuts the tag tape 503 for which printing on the tag tape 503 and information writing in the RFID tag circuit element To have been finished to a predetermined length to have the RFID label T. The network communication control part 509 carries out control of the network communication performed with the operation terminal 100 and the multi-function device 300 through the network NW. The control circuit 510 carries out operation control of the entire apparatus 500 for producing RFID labels, including the above radio frequency circuit 502, the print head 505, the cutter 507, the feeding roller 508, and the network communication control part 509.

In the apparatus 500 for producing RFID labels with the above configuration, when the RFID label T is to be produced, at least one piece of additional information such as document number, document type, paper size and page number, which will be described later, relating to the paper document S is written in the IC circuit part 150 of the RFID tag circuit element To through the apparatus antenna 501 according to the scanning of the paper document S by the scanner portion 3 of the multi-function device 300. Further, at least one piece of additional information relating to the paper document S is printed on the tag tape 503 by the print head 505 according to the scanning of the paper document S by the scanner portion 3 (the details will be described later).

The radio frequency circuit 204 makes an access to the information in the IC circuit part 150 of the RFID tag circuit element To in the RFID label T through the reader antenna 203, and the control circuit 206 of the reader 200 processes a signal read from the IC circuit part 150 of the RFID tag circuit element To in the RFID label T and creates various commands to make an access to the IC circuit part 150 of the RFID tag circuit element To.

Though not described in the above, the above-described radio frequency circuit 502 of the apparatus 500 for producing RFID labels also has the configuration similar to that of the radio frequency circuit 204 of the reader 200.

In the document management system DS with the above configuration, the document management is carried out by the following procedures. That is, when the operator places the paper document S to be managed on the manuscript tray 9 of the multi-function device 300, selects and inputs a document type of the paper document S using the operation panel 4 and also inputs a scan start command, the paper document S is fed by the automatic manuscript feeding mechanism 7 and the scanning is carried out. At this time, the paper size of the paper document S is detected, and the page number is counted. Image data of the paper document S created by the scanning is registered in the database 92. At this time, a document number corresponding to the scanned paper document S is taken. Then, print data and additional information of the paper document S, such as document number, document type, paper size, and page number, corresponding to the taken document number are transmitted from the multi-function device 300 to the apparatus 500 for producing RFID labels, together with a tag label production request.

As a result, in the apparatus 500 for producing RFID labels, the RFID label T in which the additional information is written in the RFID tag circuit element To and an appropriate print, that is document number, here, on the basis of the print data is performed is produced. The operator affixes the produced RFID label T on the paper document S and then, stores the paper document S in an appropriate storage place such as a book storeroom. On the other hand, the tag ID of the RFID tag circuit element To of the produced RFID label T is transmitted from the apparatus 500 for producing RFID labels to the multi-function device 300. In the multi-function device 300 having received the tag ID, the tag ID and the document number are registered in the database 92 in association with the corresponding image data. At this time, at the printer portion 2 of the multi-function device 300, copying of the paper document S to be managed and printing a ledger sheet according to the document type are carried out.

The operator may input detailed information such as document name, producer name of the paper document S to be managed with the operation terminal as necessary and register it in the database 92 of the multi-function device 300 in association with the image data, for example.

On the other hand, if not the image data but the paper document S as original itself is needed such as in the case of tax audit, the operator specifies the required paper document S with the operation terminal 100, that is, the operator inputs the document number. As a result, a request signal of the tag ID of the specified paper document S is transmitted from the operation terminal 100 to the multi-function device 300. When the tag ID is transmitted from the multi-function device 300 to the operation terminal 100 in response to that, the operation terminal 100 transmits the received tag ID to the reader 200. The tag ID may be plural.

The operator searches the specified paper document S from among a plurality of documents stored in the book storeroom, for example using the reader 200. That is, using the reader 200, information reading is carried out from the RFID label T provided at each document by specifying the tag ID received from the operation terminal 100 via radio communication. If the information reading is successful, it means that the search-target paper document S has been found, while if the information reading is not successful, it means that the search-target paper document S has not been found. Then, the search result as information reading result is transmitted from the reader 200 to the operation terminal 100.

The operation terminal 100 transmits a search result and a printing request received from the reader 200 to the multi-function device 300. As a result, at the printer portion 2 of the multi-function device 300, the printing of the search result is carried out by the reader 200.

Subsequently, in the document management carried out as above, control contents executed by each device of the document management system DS will be described.

Figure 7:
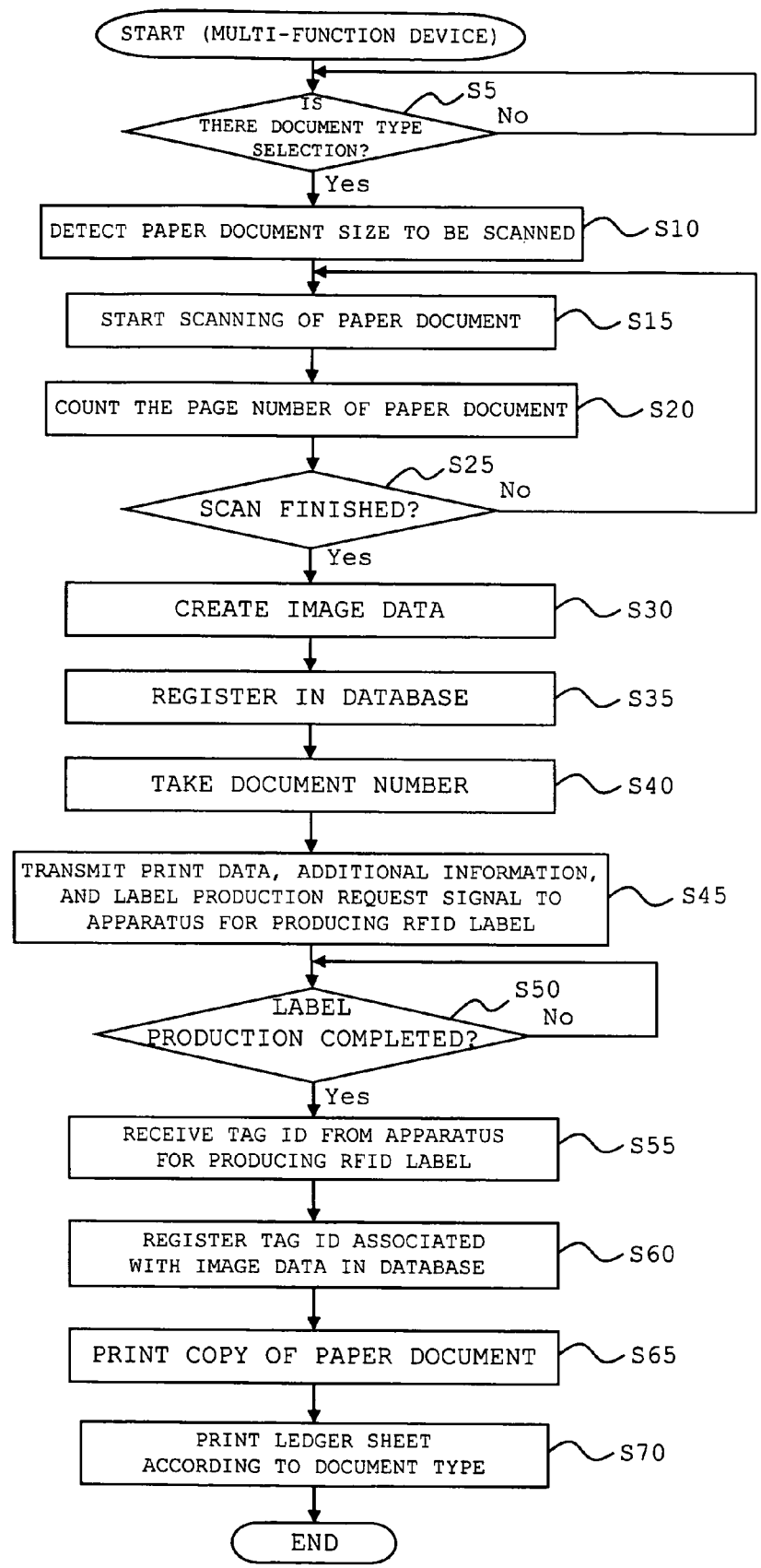
FIG. 7 is a flowchart illustrating control contents executed by a CPU of a control circuit of the multi-function device.

The control contents executed by the CPU 81 of the control circuit 80 in the multi-function device 300 are described by using FIG. 7 as bellow.

At Step S5, the CPU 81 determines if the operator has selected a document type or not. Here, the document type is type information of the paper document S to be scanned, which is selected and input by the operator when the paper document S is to be scanned by the multi-function device 300, and a plurality of document types such as contract, specification, drawing, delivery slip, invoice, and receipt, is prepared and registered in advance in an appropriate storage device such as the RAM 83. Specifically, the CPU 81 outputs a control signal to the display control part 87 so as to have a list display of the document type made on the liquid crystal display 41. When the operator selects the document type using the operation key 40 while referring to the list display, the operation signal is input to the CPU 81 through the input detection portion 88. The CPU 81 determines if the operator has selected the document type or not based on whether the operation signal from the operation key 40 has been input or not. This step is repeated till the document type is selected, and if the selection is made, the determination is satisfied, and the routine goes to Step S10.

At Step S10, the CPU 81 detects the paper size of the paper document S to be scanned. The paper size is detected on the basis of a position of the movable wall portion 9*a* of the manuscript tray 9 as described above.

At Step S15, the CPU 81 outputs a control signal to the motor driving portion 85 and the scanner control part 91 so as to drive the sheet supply motor 27 and the sheet discharge motor 28 and feeds out the paper document S placed on the manuscript tray 9 to the reading face 13 and carries out the scanning by the image reading unit. The scanning operation is started when the operator inputs a scan start command using the operation key 40.

At Step S20, the CPU 81 counts the number of pages of the paper document S to be scanned. Specifically, the paper face is detected by an optically detecting device (not shown) provided on the feeding path of the paper document S, and the number of pages is counted each time the detection of the paper face is interrupted. The number of pages may be calculated on the basis of a driving amount as feeding amount of the sheet supply motor 27 or sheet discharge motor 28 and the paper size detected at Step S10, for example. The detecting device may be a mechanically detecting device.

At Step S25, the CPU 81 determines if scanning of all the paper documents S has been completed or not. This determination is made by detecting presence or absence of the sheet on the manuscript tray 9 by the mechanically detecting device (not shown). The mechanically detecting device may be an optically detecting device. If there is a sheet on the manuscript tray 9, it is considered that the scanning of the paper document S has not been finished yet, the determination is not satisfied, and the routine goes to the preceding Step S15. On the other hand, if there is no sheet on the manuscript tray 9, it is considered that the scanning of the paper document S has been finished, the determination is satisfied, and the routine goes to Step S30.

At Step S30, the CPU 81 creates image data of the paper document S on the basis of the scan result and registers the image data created at Step S35 in the database 92. Then, at Step S40, the CPU 81 takes the document number corresponding to the paper document S for which the scanning has been executed.

At Step S45, the CPU 81 creates print data to be printed on the RFID label T, such as print data corresponding to the document number taken as above, here, and the print data and additional information of the paper document S, such as document number, document type, paper size, page number, here. Note that the other information may be made as the print data. The same applies to the following. The document number, the document type, the paper size, or page number may be a part of that or include other information. The same applies to the following. The print data to be printed on the RFID label T is transmitted to the apparatus 500 for producing RFID labels together with a label production request signal to request production of the RFID label T through the network NW.

At Step S50, the CPU 81 determines if the production of the RFID label T has been completed or not based on whether a label production completion signal (See Step S170 in FIG. 9, which will be described later) indicating completion of the production of RFID label T transmitted from the apparatus 500 for producing RFID labels has been received through the network NW or not. This step is repeated till the label production completion signal is received, and if received, the determination is satisfied, and the routine goes to Step S55.

At Step S55, the CPU 81 receives the tag ID (See Step S180 in FIG. 9, which will be descried later) of the RFID tag circuit element To of the RFID label T transmitted from the apparatus 500 for producing RFID labels through the network NW. This tag ID is read by information transmission and reception via radio communication with the RFID tag circuit element To when the RFID label T is produced in the apparatus 500 for producing RFID labels.

At step S60, the CPU 81 registers the tag ID obtained as above in association with the already-registered image data in the database 92. At this time, the additional information is also registered in the database 92 in association with the image data and the tag ID.

At step S65, the CPU 81 reads out the image data of the paper document S created at the preceding Step S30 and stored in the RAM 83, outputs a control signal to the printer control part 84 and performs printing of the read-out image data. As a result, a copy as first duplicate of the paper document S for which the scanning has been executed is generated. This copy is used for spare separate from the original of the paper document S or for storage or for organization with the ledger sheet, which will be described later by binding, for submission to a legal division in a company, for example.

At Step S70, the CPU 81 reads out image data of the ledger sheet according to the document type of the paper document S for which the scanning has been executed from the database 92, outputs a control signal to the printer control part 84, and executes the printing of the ledger sheet. This ledger sheet is for organizing and containing the copy of the paper document S generated at Step S65 and used with predetermined entries filled in with the copy. The image data of the ledger sheet is prepared in plural corresponding to each document type in advance and registered in an appropriate storage device such as database 92, here. Then, this flow is finished.

As described above, the image data, tag ID, and additional information are registered in the database 92 in association with one another at Step S35 and Step S60.

Figure 8:
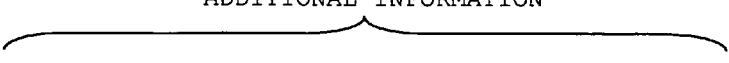
FIG. 8 conceptually illustrates an example of stored contents of a database when image data, tag ID and additional information are associated with one another and registered.

As shown in FIG. 8, in the database 92, the additional information made up of the tag ID, image data, document numbers, document types, paper sizes, and page numbers are registered in association with one another. The associated information is registered for each scanned paper document. In the exemplified example, the Portable Document Format (PDF as International Standard ISO32000-1) is employed as the image data, but other data formats such as bitmap, for example, may be used.

Though not particularly included herein, information other than the above, such as document name, producer name, authority information that limits acquisition of the image data, for example, may be included in the additional information as necessary. These types of information is transmitted from the operation terminal 100 to the multi-function device 300 by input of the operator in the operation terminal 100 through the operation portion 102 and registered in the database 92 in association with the image data, for example.

Figure 9:
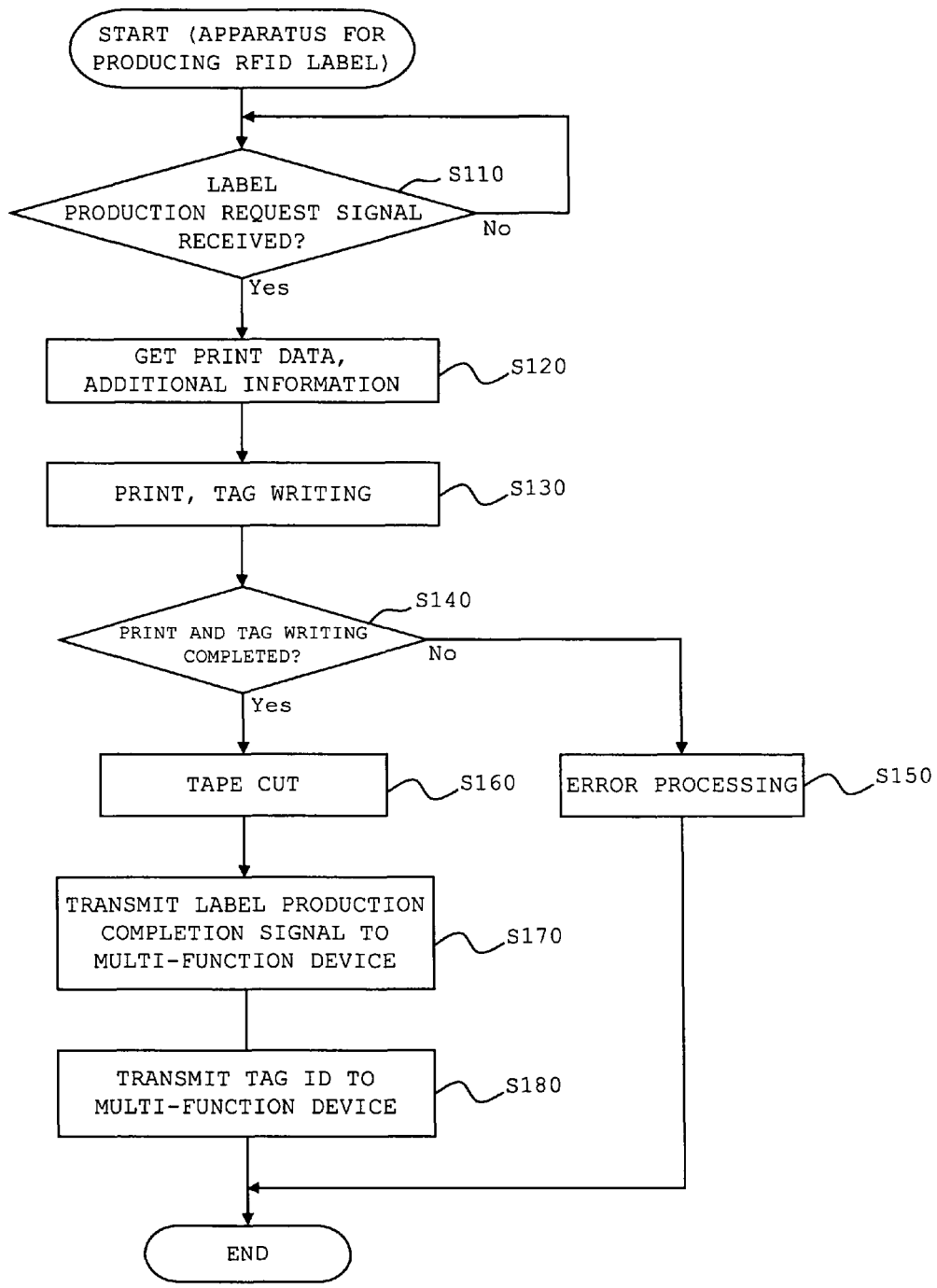
FIG. 9 is a flowchart illustrating a control procedure executed by a control circuit of the apparatus for producing RFID labels when the RFID label is produced.

A control procedure executed by the control circuit 510 of the apparatus 500 for producing RFID labels is described bellow by using FIG. 9. The procedure is executed when the RFID label T is to be produced by the apparatus 500 for producing RFID labels having received the label production request signal, for example transmitted from the multi-function device 300 at Step S45.

As shown in FIG. 9, at Step S110, the control circuit 510 determines if the label production request signal including the print data and additional information has been received or not from the CPU 81 of the multi-function device 300 through the network NW and the network communication control part 509. This step is repeated till the label production request signal is received from the multi-function device 300, and when received, the determination is satisfied and the routine goes to Step S120.

At Step S120, the control circuit 510 gets the print data and additional information to be printed on the RFID label T on the basis of the signal received from the multi-function device 300. As described above, the print data is the document number, and the additional information includes the document number, document type, paper size, and page number.

At Step S130, the control circuit 510 performs printing on the desired print area on the tag tape 503 by the print head 505 on the basis of the print data obtained as above. In addition, access information according to the tag reading signal for information reading from the RFID tag circuit element To by the radio frequency circuit 502 is created and transmitted to the RFID tag circuit element To through the apparatus antenna 501 so that the tag ID is read from the RFID tag circuit element To, and the access information according to the tag writing signal for information writing in the RFID tag circuit element To is created and transmitted through the apparatus antenna 501 by specifying the tag ID so that the whole or a part of the additional information is written in the IC circuit part 150 of the RFID tag circuit element To.

At Step S140, the control circuit 510 determines if the print and information writing executed at Step S130 has been normally finished or not. The determination on whether the information writing has been normally finished or not is, for example, specifically made by creating access information according to a confirmation signal that confirms the contents of the IC circuit part 150 of the RFID tag circuit element To by the radio frequency circuit 502, transmitting it to the RFID tag circuit element To through the apparatus antenna 501, and on the basis of a reply signal transmitted from the RFID tag circuit element To as a writing target in response to that, and determining if the writing of the additional information has been normally completed or not. If the print and information writing has not been normally finished, the routine goes to Step S150. Then, the control circuit 510 transmits a control signal to the control circuit 105 of the operation terminal 100 through the network communication control part 509 and the network NW and executes error processing to have a fact ("The printing has not been normally finished", "The tag writing has not been normally finished", for example) displayed on the display portion 101. The error display may be made by the liquid crystal display 41 of the multi-function device 300. After that, this flow is finished. On the other hand, if the print and information writing has been normally finished, the routine goes to Step S160.

At Step S160, the control circuit 510 executes cutting of the tag tape 503 by the cutter 507. As a result, the RFID label T in which the additional information is written in the IC circuit part 150 of the RFID tag circuit element To and the document number is printed on the print area is produced (See FIG. 10, which will be described later).

At Step S170, the control circuit 510 transmits a label production completion signal that notifies that the production of the RFID label T has been completed to the CPU 81 of the multi-function device 300 through the network communication control part 509 and the network NW.

At Step S180, the control circuit 510 transmits the tag ID of the RFID tag circuit element To of the produced RFID label T to the CPU 81 of the multi-function device 300 through the network communication control part 509 and the network NW. This tag ID is read from the RFID tag circuit element To when the additional information is written in the RFID tag circuit element To at the above-described Step S130. Then, this flow is finished.

The RFID label T produced by the apparatus 500 for producing RFID labels is affixed to the paper document S.

As shown in FIG. 10, the paper document S is a contract filing slip, in other words, the document type is "contract", and the RFID label T produced by the apparatus 500 for producing RFID labels is affixed to its lower part. On the RFID label T, a document number of the paper document S, "A0035" is printed. The operator affixes the RFID label T and then, stores the paper document S in an appropriate storage place such as book storeroom, for example.

Figure 11:
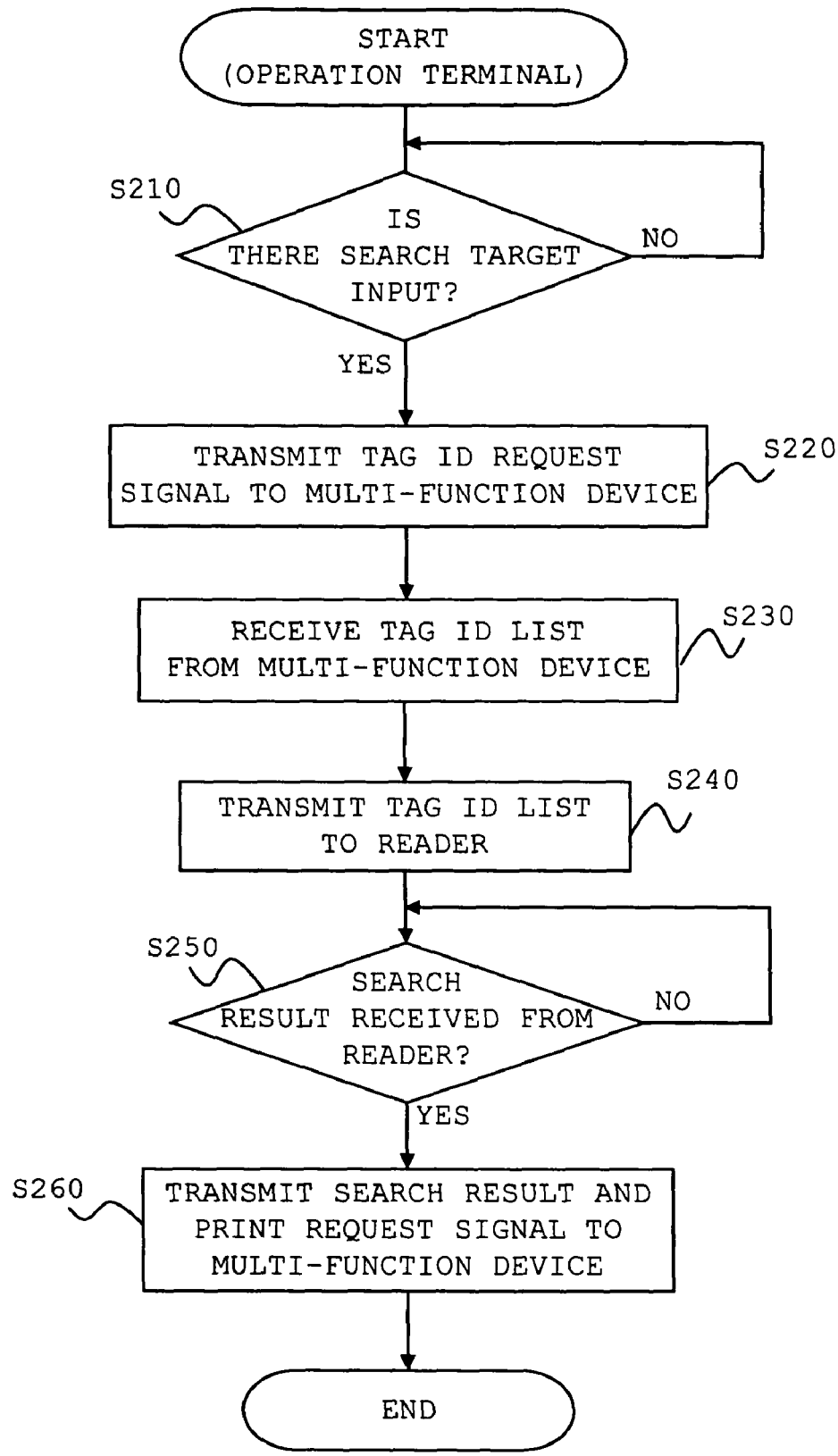
FIG. 11 is a flowchart illustrating a control procedure executed by a control circuit of an operation terminal when an operator specifies a document to be searched by the operation terminal.

A control procedure executed by the control circuit 105 of the operation terminal 100 is described bellow by using FIG. 11. The procedure is executed when the operator performs an operation to specify the document to be searched by the operation terminal 100 in a search of the paper document S itself. This flow is started when the operator inputs a document search start command through the operation portion 102 of the operation terminal 100.

At Step S210, the control circuit 105 determines if there has been an input by the operator on the paper document S to be searched. Specifically, the control circuit 105 outputs a control signal to the display portion 101 so that a list such as document names, document types, for example of the paper documents S registered in the database 92 is displayed. When the operator selects the paper document S to be searched using the operation portion 102 while referring to the list display, the operation signal is input to the control circuit 105. The control circuit 105 determines if the operator has selected the search target or not based on whether the operation signal from the operation portion 102 has been input or not. This step is repeated till the search target is selected, and if the selection is made, the determination is satisfied, and the routine goes to Step S220.

At Step S220, the control circuit 105 transmits a tag ID request signal requesting a tag ID and a document number corresponding to the paper document S selected at Step S210 to the control circuit 80 of the multi-function device 300 through the network communication control part 103 and the network NW.

At Step S230, the control circuit 105 receives a list of the tag IDs and the document numbers returned from the multi-function device 300 in response to the tag ID request signal through the network NW and the network communication control part 103. The list may be plural and hereinafter referred to as a tag ID list.

At Step S240, the control circuit 105 outputs a control signal to the inter-terminal communication control part 104 and transmits the tag ID list received from the multi-function device 300 to the control circuit 206 of the reader 200 via the inter-terminal radio communication.

At Step S250, the control circuit 105 determines if a search result has been received from the reader 200 via the inter-terminal radio communication or not (See Step S360 in FIG. 12, which will be described later). The information of this search result includes success or failure information of the search to the paper document S corresponding to each tag ID included in the tag ID list. This step is repeated till the search result is received from the reader 200, and if received, the determination is satisfied, and the routine goes to Step S260.

At Step S260, the control circuit 105 transmits the search result information received from the reader 200 together with a print request signal to the control circuit 80 of the multi-function device 300 through the network NW. As a result, in the multi-function device 300, the search result of the reader 200 is printed (See FIG. 13, which will be described later). Then, this flow is finished.

Figure 12:
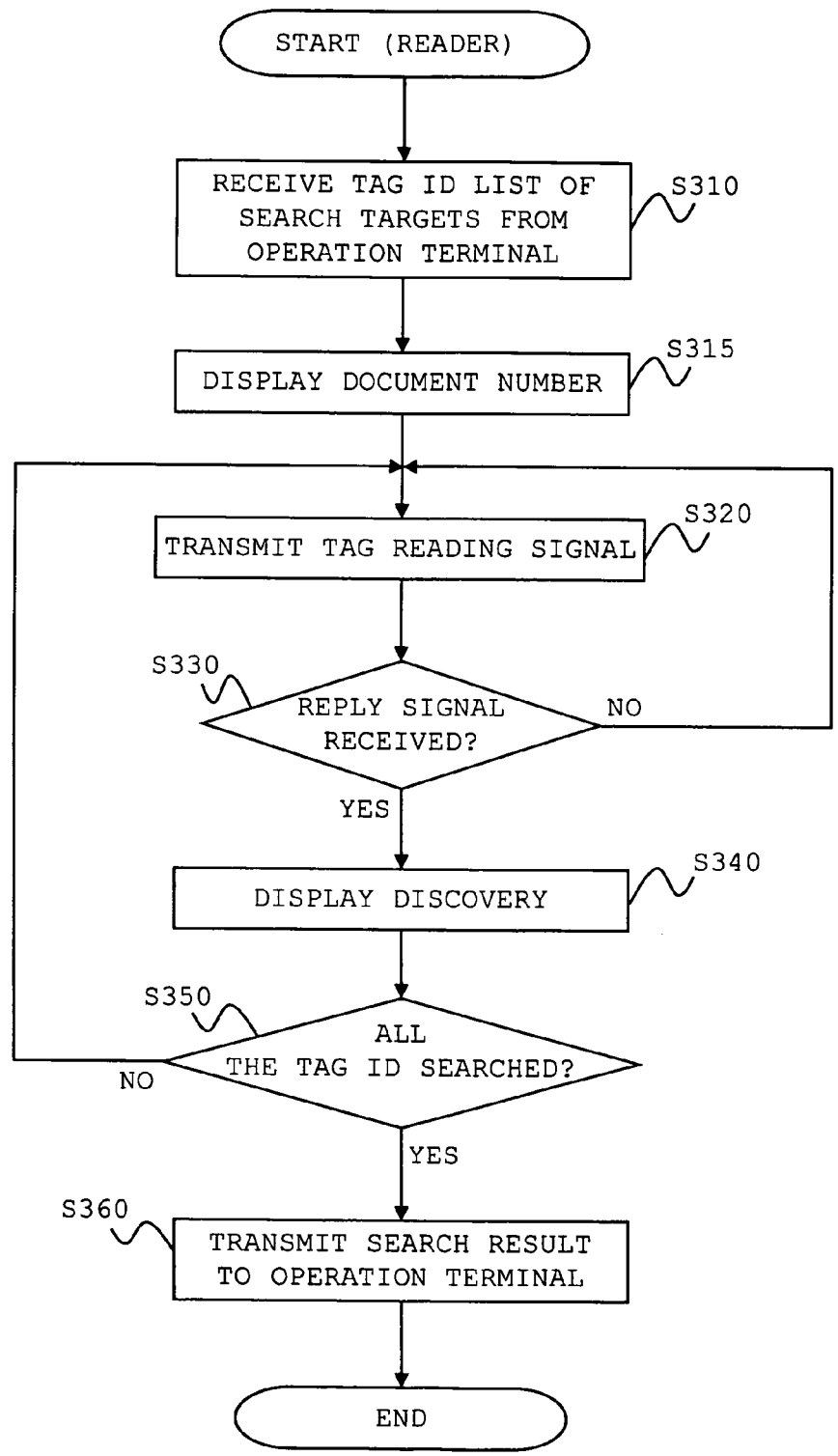
FIG. 12 is a flowchart illustrating a control procedure executed by a control circuit of a reader when an operator searches the paper document using the reader.

A control procedure executed by the control circuit 206 of the reader 200 is described bellow by using FIG. 12. The procedure is executed when the operator searches the paper document S using the reader 200. This flow is started when the operator inputs a search start command through the operation portion 202 of the reader 200.

At Step S310, the control circuit 206 outputs a control signal to the inter-terminal communication control part 205 and receives the tag ID list (See Step S240 in the FIG. 11) corresponding to the paper document S to be searched transmitted from the control circuit 105 of the operation terminal 100 via the inter-terminal radio communication.

At Step S315, the control circuit 206 outputs a display signal to the display portion 201 so as to display the document numbers included in the received tag ID list. As a result, the operator can make a search while confirming the document number of the paper document S to be searched. In addition, if the paper document S to be searched is found, the document number printed on the RFID label T affixed to the paper document S and the document number displayed on the display portion 201 can be visually compared and checked.

At Step S320, the control circuit 206 outputs a control signal to the radio frequency circuit 204 and transmits an interrogation wave applied with predetermined modulation to the RFID tag circuit element To present in the communication area through the reader antenna 203 as a tag reading signal that reads out data recorded in a memory part (not shown) of the applicable RFID tag circuit element To by specifying the tag ID or one of the tag IDs in the case of plural received at Step S310.

At Step S330, the control circuit 206 determines if a reply signal has been received or not from the RFID tag circuit element To in the communication area in response to the tag reading signal. If it is not the paper document S to be searched, a reply signal is not received, and the determination is not satisfied, and the routine returns to Step S320. Alternatively, the document number corresponding to the tag ID and the document number in the data read from the memory part of the RFID tag circuit element To may be collated. As a result, it can be confirmed that the memory part is not broken or the data is not altered. On the other hand, if it is the paper document S to be searched, the reply signal is received, and the determination is satisfied, and the routine goes to Step S340.

At Step S340, the control circuit 206 outputs a display signal to the display portion 201 so as to make a display to notify that the paper document S to be searched is found. At this time, on the display portion 201, using the additional information such as document number, document type, paper size, and page number included in the received reply signal, a display such as "The paper document S with the document number "A0035", document type "contract", A4 size, 1 page has been found!" is made. As a result, when the paper document S is found by the reader 200, the operator can immediately grasp the outline aspect of the paper document S.

At Step S350, the control circuit 206 determines if the search has been completed for all the tag IDs included in the tag ID list received at Step S310 or not. If the search has not been completed, the determination is not satisfied, and the routine returns to the preceding Step S320. On the other hand, if the search has been completed, the determination is satisfied, and the routine goes to Step S360.

At Step S360, the control circuit 206 outputs a control signal to the inter-terminal communication control part 205 and transmits the search result to the control circuit 105 of the operation terminal 100 via the inter-terminal radio communication. Then, this flow is finished.

In the above, Step S320 and step S330 constitute an information obtainment portion configured to read information from the RFID tag circuit element via radio communication described in each claim. Further, step S360 constitutes an information transmission portion configured to transmit an information reading result by the information obtainment portion via radio communication.

A search result list is described by using FIG. 13. The list is printed in a format can list the search results by the multi-function device 300 having received the search result by the reader 200 and the print request signal from the operation terminal 100. The contents of the search result list shown in FIG. 13 correspond to the paper document S shown in the above-described FIG. 10.

In this example, the document number, document type, document name, producer name, paper size, and the page number of the paper document S which was found, that is, search was successful are included in the search result list, and the information of the paper document S which was not found yet, that is, search is failed, is not printed. Further, the document name and the producer name are included if the operator input them as the detailed information of the paper document S at the operation terminal 100 when necessary, and they are not included in the search result list if the operator has not input the detailed information.

It may be so configured that information of not only the paper document S which was found, that is, search was successful, but also of the paper document S which was not found yet, that is, search was failed, is included in the list and success or failure of the search is indicated by "Yes", "No", for example for each of the documents. Further, with regard to the discovered paper document S, its location may be also printed.

In the above-described embodiment, if the operator places the paper document S on the manuscript tray 9 of the multi-function device 300 and supplies the manuscript, the scanner portion 3 carries out scanning and creates image data. This image data is stored in the database 92. As a result, after that, the corresponding image data can be obtained from the database 92 without directly using the paper document S.

On the other hand, if the paper document S has been scanned, the apparatus 500 for producing RFID labels carries out radio communication with the RFID tag circuit element To through the apparatus antenna 501 and produces the RFID label T to be affixed to the paper document S. The tag ID of the RFID tag circuit element To of the RFID label T is associated with the above-described image data of the paper document S and stored in the database 92. Therefore, since the RFID label T is affixed onto the paper document S, by specifying the RFID tag circuit element To of the RFID label T with the tag ID and reading the information via radio communication using the reader 200, a location of the paper document S can be searched after that.

As described above, the image data of the paper document S can be obtained from the database 92 and the contents can be viewed at any time in usual times, while if the paper document S itself is needed, the paper document S can be easily obtained by searching the corresponding RFID label T via radio communication using the reader 200. At this time, by executing both making the paper document S into electronic data and attachment of the RFID label T onto the paper document S in a lump, efficient document management can be realized.

Here, the effect of document management with higher efficiency will be described in more detail using a comparative example. Suppose a comparative example with a configuration in which the RFID tag circuit element To is provided on the paper document S in advance instead of production of the RFID label T in scanning of the paper document S as in this embodiment. In this case, only the tag ID is stored in the RFID tag circuit element To provided at the paper document S in advance, and it is not possible to store the additional information such as the document type, paper size, page number, for example of the paper document S in the RFID tag circuit element To and to use the additional information in making a search as in this embodiment. Further, since the RFID tag circuit element To is provided at the paper document S in advance, a print of the information relating to the paper document S, for example, cannot be displayed on a surface of the RFID tag circuit element To or the tag medium incorporating the RFID tag circuit element To, which implies room for improvement in terms of convenience in the search. Moreover, since the RFID tag circuit element To is provided at the paper document S in advance, there is no room for selecting an affixing place such as front face or back face, upper end or lower end, for example, of the RFID tag circuit element To in the paper document S, which might incur deterioration in communication capability of radio communication in the search depending on the storage state of the paper document S.

On the other hand, in the document management system DS of this embodiment, when the paper document S is searched by the reader 200 and found as above, the discovery display can be made using the additional information, which can improve convenience in the search. Further, since the document number is printed on the RFID label T affixed to the paper document S, the operator can compare and check the print on the RFID label T with the document number displayed on the display portion 201 of the reader 200 when the paper document S is found, which can also improve convenience in the search. Moreover, in this embodiment, since the produced RFID label T is affixed onto the paper document S manually by the operator, it is possible to affix it at a position, considering the subsequent storage mode. As a result, the deterioration in the communication capability of radio communication in the subsequent search can be prevented, and efficient searches can be made.

As described above, the document management system of this embodiment is more advantageous than the comparative example in terms of convenience and efficiency in searching of the paper document S itself, and efficient document management can be realized.

Further, particularly in this embodiment, in the apparatus 500 for producing RFID labels, in producing the RFID label T, the additional information relating to the paper document S is written in the IC circuit part 150 of the RFID tag circuit element To through the apparatus antenna 501. As a result, only by reading information by the reader 200 from the RFID tag circuit element To of the RFID label T affixed onto the paper document S, the information such as the document number, document type, paper size, and page number of the paper document S can be obtained. As a result, since the outline aspect of the paper document S can be grasped, a convenience for the operator can be improved.

Further, particularly in this embodiment, in the apparatus 500 for producing RFID labels, in producing the RFID label T, the additional information relating to the paper document S is printed by the print head 505 on a predetermined area of the tag tape 503. As a result, the operator can visually obtain the information such as the document number, document type, paper size, and page number of the paper document S by looking at the RFID label T. As a result, since the outline aspect of the paper document S can be grasped, a convenience for the operator can be improved.

Further, particularly in this embodiment, the printer portion 2 of the multi-function device 300 prints and generates a copy of the paper document S according to the scanning by the scanner portion 3. As a result, when the operator supplies the paper document S to the multi-function device 300 so as to produce the RFID label T to be affixed on the paper document, a copy of the paper document S can be generated at the same time. Therefore, a separate operation is not needed if a duplicate for spare, for example is to be stored separately from the original of the paper document S, an operation burden on the operator can be reduced, and convenience can be improved.

Further, particularly in this embodiment, the following effects can be obtained. That is, if a copy for spare, for example is to be stored separately from the original of the paper document S, there might be a case in which a ledger, for example for organizing and storing is provided for the copy so that predetermined items can be filled in the ledger to be organized. Here, in this embodiment, when the operator operates and inputs the document type of the paper document S by the operation key 40 of the multi-function device 300, in supply of the paper document S to the multi-function device 300 for scanning, the copy of the paper document S and the ledger sheet are automatically printed and generated at the same time. Therefore, the operation burden on the operator can be reduced, and convenience can be improved.

Further, particularly in this embodiment, if the operator wants to obtain the paper document S on which the RFID label T is affixed, the location of the paper document S can be searched by information reading by specifying the RFID tag circuit element To with the tag ID by the reader 200. As a result, the operator can search the paper document S easily in a short time and can obtain it.

Further, particularly in this embodiment, the reader 200 transmits the search result of the paper document S to the operation terminal 100 via the inter-terminal radio communication, and the multi-function device 300 prints the search result received from the operation terminal 100 by the printer portion 2. As a result, the search result by the reader 200, that is, whether the location of the paper document S can be searched or not and if searched, where it is located, for example can be recorded in a visually clear form by printing.

Further, particularly in this embodiment, the printer portion 2 of the multi-function device 300 prints the search result of the paper document S by the reader 200 in the format capable of listing, including at least one of the additional information such as document number, document type, paper size, or page number of the paper document S. As a result, even if the plurality of paper documents S is searched by the reader 200, the information reading result such as success or failure of the search, location, for example, of each paper document S can be recorded easily to be understood in printing, capable of listing, including the additional information of the paper document S.

Note that the present invention is not limited to the above embodiment but is capable of various deformations within a range not departing from its gist and technical idea. Such variations will be described below in order.

(1) When a Server Having a Database is Separately Provided:

In the above embodiment, the multi-function device 300 has the database 92, and registration of the image data created by scanning and registration of the tag ID associated with that, for example are carried out in the multi-function device 300, but not limited to that. That is, a server having a database may be provided separately from the multi-function device 300. In this case, the image data created by scanning is transmitted to the server from the multi-function device 300 and registered in the database. Further, numbering of the document numbers, association between the image data and the tag ID, and registration are also executed on the server side. Moreover, if the paper document S is to be searched, it is only necessary that a tag ID request signal of the paper document S to be searched is transmitted to the server from the operation terminal 100. With this variation, too, an effect similar to that of the above embodiment can be obtained.

(2) When Print Data is to be Created on the Basis of the Image Data:

In the above embodiment, the document number taken in the multi-function device 300 is printed so as to produce the RFID label T, but not limited to that. For example, a format is fixed for documents used in an office, for example and the type, contents, for example of the paper document S are described briefly in sentence information as text in a specific area of the sheet of the paper document S in many cases. Then, in this variation, it may be so configured that the text in the specific area is read by the scanner portion 3, and the text or text image corresponding to the reading result at that time is printed on the tag tape 503 so as to produce the RFID label T.

Figure 14:
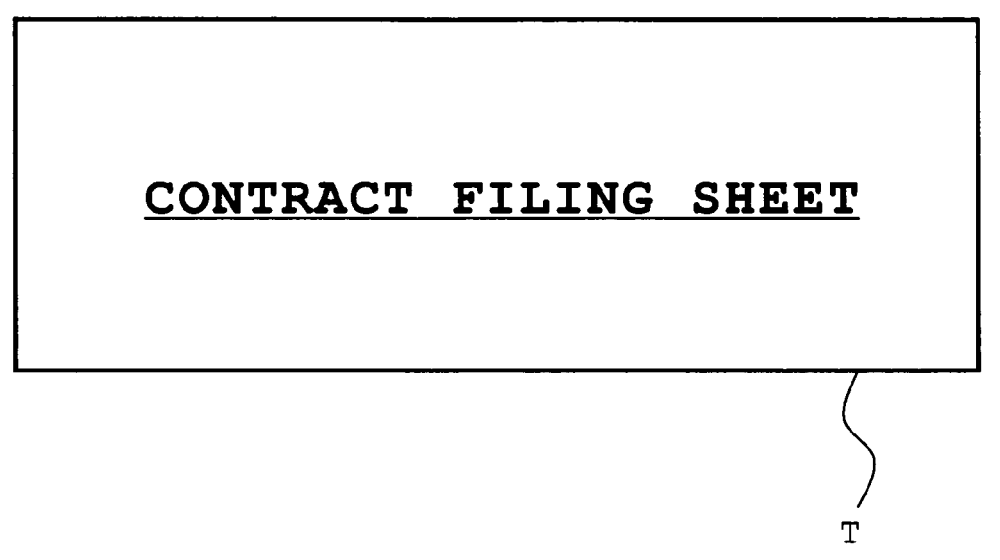

For example, in the paper document S shown in the above-described FIG. 10, the document name is described at an upper part of the paper, and this portion is the specific area R. In this case, for example, an RFID label T is produced by the apparatus 500 for producing RFID labels using the image data of the document name, "contract filing slip" portion in the specific area R as the print data, as shown in FIG. 14. In this example, the image data of the document name portion in the specific area R is printed as it is, but it may be so configured that text data is created from the image data by an image recognition device and the text data is printed, for example.

As a result, when the operator is to affix the RFID label T produced by the apparatus 500 for producing RFID labels on the paper document S, the operator can affix it onto the corresponding paper document S without an error and easily to be understood while referring to the text or text image printed on the RFID label T.

(3) When a Copy is Printed with the Search Result List:

Though not particularly executed in the above embodiment, when the search result list of the paper documents S by the reader 200 is printed by the multi-function device 300, a copy of the paper document S may be generated at the same time.

In this case, the CPU 81 of the multi-function device 300 executes printing of the search result list when it receives the search result by the reader 200 and the print request signal from the operation terminal 100 and also may read, as a function of an image obtainment portion, the image data corresponding to the tag ID of the RFID tag circuit element To for which search was successful from the database 92 according to the search result transmitted from the reader 200 through the operation terminal 100 and execute printing of the image data so as to generate the copy as second duplicate.

As a result, when the operator searches the paper document S using the reader 200 in order to obtain the paper document S, a copy of the paper document can be also generated with the search result list. Therefore, if a copy for spare, for example is to be stored when the original of the paper document S is to be used, for example, a separate operation is not needed, and the operation burden on the operator can be reduced, and convenience can be improved.

(4) When it is Possible to Select if the RFID Label T is to be Issued or not for Every Page:

In the above embodiment, if the paper document S includes a plurality of pages, the single RFID label T is produced for the paper document S with the plurality of pages, but according to an intention of the operator, the single RFID label T may be produced for every page of the paper document S made up of the plurality of pages.

Figure 15:
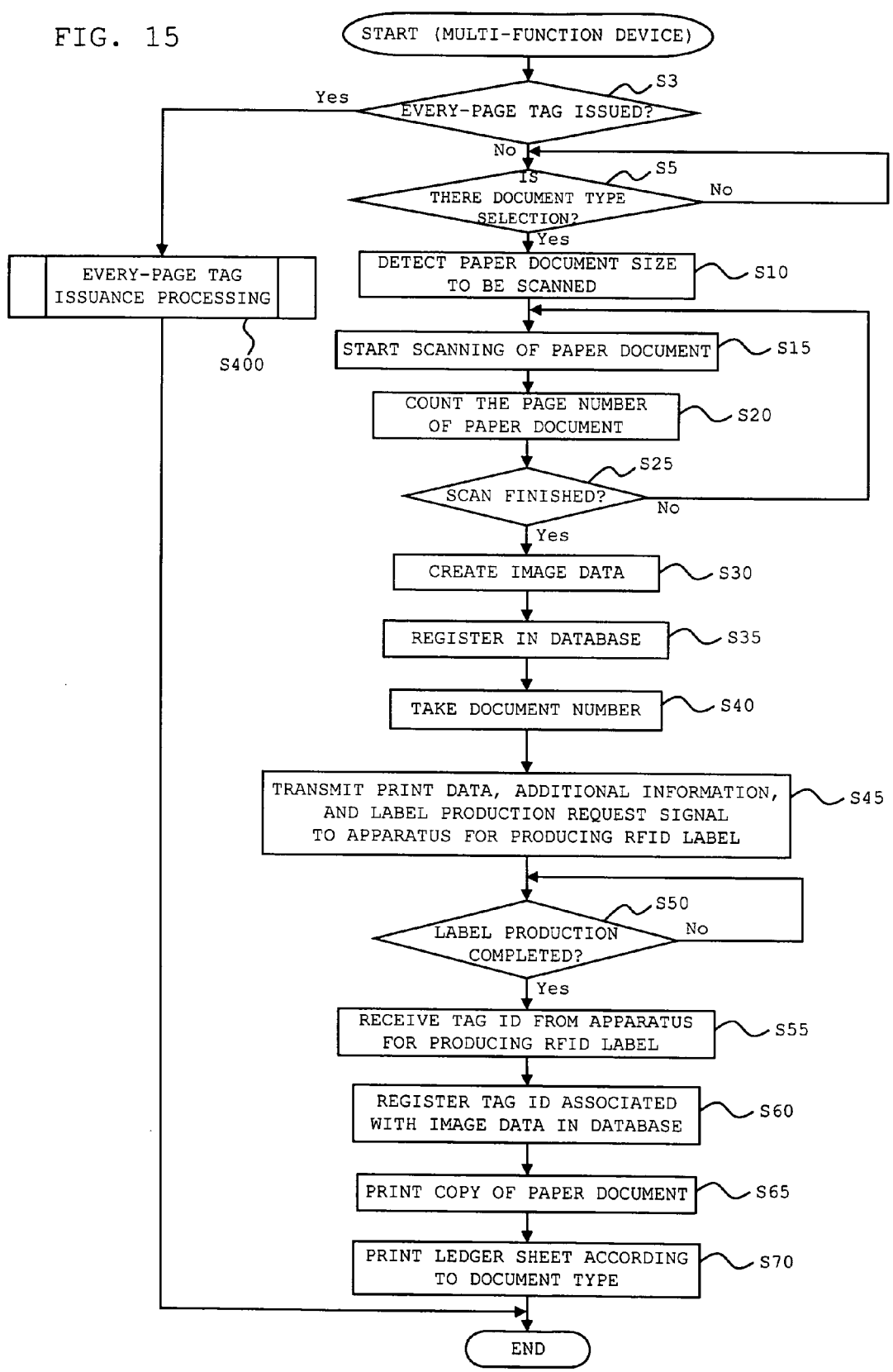
FIG. 15 is a flowchart illustrating control contents executed by the CPU of the control circuit of the multi-function device in a variation in which whether or not the RFID label is to be issued for every page can be selected.

Control contents executed by the CPU 81 of the control circuit 80 of the multi-function device 300 are described by using FIG. 15. The FIG. 15 corresponds to the above-described FIG. 7. Same reference numerals are given to the procedures similar to those in FIG. 7 and description will be omitted.

At Step S3, the CPU 81 determines if the RFID label T is to be produced or not for every page when the paper document S includes a plurality of pages. Specifically, the CPU 81 outputs a control signal to the display control part 87 so that a selection screen in which it is selectable whether the RFID label T is to be produced or not for every page of the paper document S is displayed on the liquid crystal display 41. When the operator makes a selection using the operation key 40 while referring to the selection screen, the operation signal is input into the CPU 81 through the input detection portion 88. The CPU 81 determines if the RFID label T is to be produced or not for every page on the basis of the operation signal from the operation key 40. If the RFID label T is not to be produced for every page, that is, the single RFID label T is to be produced for the paper document S with a plurality of pages, the determination is not satisfied, and the routine goes to Step S5. On the other hand, if the RFID label T is to be produced for every page, the determination is satisfied, and the routine goes to Step S400.

At Step S400, the CPU 81 executes every-page tag issuance processing (for detailed procedures, see FIG. 16, which will be described later) in which each of scanning of each page of the paper document S, production of the RFID label T, database registration, copy printing, and printing of the ledger sheet is carried out. Then, this flow is finished. Since the other procedures are the same as those in the above-described FIG. 7, description will be omitted.

A detailed procedure of the every-page tag issuance processing at Step S400 is described by using FIG. 16.

As shown in FIG. 16, Step S405 to Step S415 are similar to Step S5 to Step S15 in the above-described FIG. 7, and the CPU 81 determines if the operator has selected the document type or not, and if selected, the paper size of the paper document S to be scanned is detected, a predetermined page as single sheet in the paper document S placed on the manuscript tray 9 is fed out to the reading face 13, and scanning by the image reading unit is executed. Unlike the above-described embodiment, since the scanning is executed for each page, the pages after that are not counted (See Step S20 in FIG. 7).

The subsequent Step S425 to Step S470 are the same as Step S25 to Step S70 in the above-described FIG. 7. That is, the CPU 81 creates the image data of the applicable page on the basis of the scan result of the predetermined one page as single sheet in the paper document S and registers it in the database 92. Then, the document number corresponding to the scanned page is taken, and the RFID label T is produced. Moreover, the tag ID of the produced RFID label T is associated with the image data and registered in the database 92. After that, the image data is printed, and the ledger sheet according to the document type is printed.

At Step S475, the CPU 81 determines if the procedure of Step S405 to Step S470 have been completed for all the pages constituting the paper document S. If not completed, the determination is not satisfied, and the routine returns to the preceding Step S405, where the similar procedure is repeated for the subsequent page. On the other hand, if completed for all the pages, the determination is satisfied, and this flow is finished.

According to this variation described above, production of the single RFID label T for the paper document S with a plurality of pages or the production of the single RFID label T for every page of the paper document S including a plurality of pages can be switched according to the intension of the operator. As a result, if the paper document S is a confidential document and needs to be managed by the page or if documents constituting the paper document S are different in document type from each other and need to be managed by the page, for example, the RFID label T may be produced for every page for the document management, while if it is only necessary to manage the entire paper document S, the entire paper document S can be managed by producing the single RFID label T for the paper document S. In this way, according to this variation, fine document management can be realized according to needs of the operator.

In the above variation, the RFID label T is produced for every page, but it may be so configured that the paper document S is divided into the predetermined number of pages in producing the RFID label T so that the paper document S can be managed in separate parts. The predetermined number of pages can be set by the operator.

(5) Others

For example, it may be so configured that a reader function is provided at the multi-function device 300, personal identification information is read from an operator tag that stores the personal identification information, held by the operator who is to scan the paper document S, the scanning is executed only by those who are authorized to do so, while the scanning is not executed by the others. As a result, only those authorized can make the paper document S into electronic data, which can improve security. Further, in this case, if a person not having the operator tag, such as a person who is to operate the multi-function device 300 for the first time, operates the multi-function device 300, it may be so configured that an input of the personal identification information is prompted, and the operator tag is produced in the apparatus 500 for producing RFID labels regardless of success or failure of the scanning.

Further, in the above, the case in which a paper medium to be managed by the document management system DS is a paper document is described as an example, but not limited to that, but various paper media such as newspaper articles, magazine articles, certificates, photos, and jackets may become management targets.

Further, in the above, the case in which the tag tape 503 for which printing and an access, such as for reading or writing, to the RFID tag circuit element To are finished is cut off with the cutter 507 so as to produce the RFID label T is described as an example, but not limited to that. That is, if label mounts, that is, so-called die-cut labels, separated in advance to a predetermined size corresponding to the label are sequentially arranged on the tape fed out of the roll, the RFID label T may be produced by peeling off only a label mount from the tape after the tape is discharged from a carry-out exit without cutting it by the cutter 507. The accessed RFID tag circuit element To is provided and the corresponding printing has been performed on the label mount. The present invention can also be applied to such a case.

Further, in the above, the RFID label T is produced by a method, that is, so-called non-laminate type without bonding, in which the printing is performed on the print-receiving tape layer provided at the tag tape 503. However, the present invention is not limited to the method. Namely, the present invention may be applied to a method of bonding, that is, so-called laminate type, by performing the printing on a cover film as print-receiving tape separate from the tag tape 503 provided with the RFID tag circuit element To. Moreover, in the above, the printing is performed when the RFID label T is produced, but the printing does not necessarily have to be preformed, but the present invention can be also applied to the one for which only the RFID tag information reading or writing is performed.

In the above, arrows shown in each of FIGS. 2, 5, 6, 7, 8, for example show an example of a flow of signals and do not limit a flow direction of the signals.

In addition, the flowcharts shown in FIGS. 9, 11, 13, 14, for example do not limit the present invention to the procedures shown in the flows, but addition/deletion or change of an order of the procedures, for example may be made within a range not departing from a gist and technical idea of the invention.

Other than those described above, methods of the embodiments and each variation may be combined as appropriate for use.

Though not specifically exemplified, the present invention should be put into practice with various changes made in a range not departing from its gist.

What is claimed is:

1. A document management system comprising:
   a scan apparatus provided with an optical reading device configured to optically read a paper medium to be processed and to create image data corresponding to said paper medium;
   a radio frequency identification (RFID) label producing apparatus configured to produce an RFID label to be affixed onto said paper medium, having a tag communication device that carries out radio communication to an RFID tag circuit element provided with an IC circuit part storing information and a tag antenna that transmits and receives information in reading by said optical reading device; and
   a database configured to store said image data corresponding to said paper medium and tag identification information of said RFID tag circuit element provided at said RFID label corresponding to said paper medium in association with each other, provided inside said scan apparatus or separately from said scan apparatus, wherein:
   said RFID label producing apparatus includes a first printing device configured to print at least one piece of additional information relating to said paper medium to a print-receiving medium provided at said RFID label according to the reading by said optical reading device,
   when there is sentence information in said paper medium, said first printing device of said RFID label producing apparatus performs, on the basis of a reading result of said optical reading device from a text in a specific area of said paper medium, printing of a text or a text image corresponding to the text in said specific area said paper medium on said print-receiving medium.

2. A document management system comprising:
   a scan apparatus provided with an optical reading device configured to optically read a paper medium to be processed and to create image data corresponding to said paper medium;
   a radio frequency identification (RFID) label producing apparatus configured to produce an RFID label to be affixed onto said paper medium, having a tag communication device that carries out radio communication to an RFID tag circuit element provided with an IC circuit part storing information and a tag antenna that transmits and receives information in reading by said optical reading device; and
   a database configured to store said image data corresponding to said paper medium and tag identification information of said RFID tag circuit element provided at said RFID label corresponding to said paper medium in association with each other, provided inside said scan apparatus or separately from said scan apparatus, wherein:
   said tag communication device of said RFID label producing apparatus writes at least one piece of additional information relating to said paper medium in said IC circuit part of said RFID tag circuit element according to the reading by said optical reading device,
   said scan apparatus includes:
   a second printing device that prints and generates a first duplicate of said paper medium according to the reading by said optical reading device; and
   an operating device with which an operator can operate and input a type of said paper medium, and
   said second printing device prints and generates a ledger sheet according to an operation input of said operating device when the first duplicate of said paper medium is printed.

3. A document management system comprising:
   a scan apparatus provided with an optical reading device configured to optically read a paper medium to be processed and to create image data corresponding to said paper medium;
   a radio frequency identification (RFID) label producing apparatus configured to produce an RFID label to be affixed onto said paper medium, having a tag communication device that carries out radio communication to an RFID tag circuit element provided with an IC circuit part storing information and a tag antenna that transmits and receives information in reading by said optical reading device; and
   a database configured to store said image data corresponding to said paper medium and tag identification information of said RFID tag circuit element provided at said RFID label corresponding to said paper medium in association with each other, provided inside said scan apparatus or separately from said scan apparatus, wherein:

said tag communication device of said RFID label producing apparatus writes at least one piece of additional information relating to said paper medium in said IC circuit part of said RFID tag circuit element according to the reading by said optical reading device, and wherein the document management system further comprises a reader apparatus having an information obtainment portion configured to specify said RFID tag circuit element of said RFID label produced by said RFID label producing apparatus and affixed on said paper medium using said tag identification information obtained from said database and to read information via radio communication from the specified RFID tag circuit element.

4. The document management system according to claim 3, wherein:

said reader apparatus includes an information transmission portion configured to transmit an information reading result by said information obtainment portion via radio communication; and said second printing device of said scan apparatus prints the information reading result of said information obtainment portion transmitted by said information transmission portion.

5. The document management system according to claim 4, wherein:

when said information obtainment portion of said reader apparatus executes information reading for a plurality of said RFID tag circuit elements and said information transmission portion transmits the information reading results, said second printing device of said scan apparatus prints the information reading results of said information obtainment portion for the plurality of said RFID tag circuit elements in a format capable of listing, the information reading results including at least one piece of said additional information relating to said paper medium and transmitted by said information transmission portion.

6. The document management system according to claim 3, wherein:

said scan apparatus includes image obtainment portion configured to obtain said image data from said database, said image data corresponding to said tag identification information of said RFID tag circuit element for which reading is successful, in accordance with the information reading result of said information obtainment portion transmitted by said information transmission portion; and said second printing device prints and generates a second duplicate of said paper medium on the basis of said image data obtained by said image obtainment portion.

* * * * *